(12) United States Patent
Kuo et al.

(10) Patent No.: US 9,976,646 B2
(45) Date of Patent: May 22, 2018

(54) ANGLE REGULATION DEVICE

(71) Applicant: Automotive Research & Testing Center, Lugong (TW)

(72) Inventors: Hsien-Yu Kuo, Lugong (TW); Jiun-Jie Chen, Lugong (TW); Liang-Cheng Chang, Lugong (TW); Shun-Hung Chen, Lugong (TW)

(73) Assignee: Automotive Research & Testing Center, Lugong, Changhua County (TW)

( * ) Notice: Subject to any disclaimer, the term of this patent is extended or adjusted under 35 U.S.C. 154(b) by 394 days.

(21) Appl. No.: 14/723,938

(22) Filed: May 28, 2015

(65) Prior Publication Data

US 2016/0348770 A1   Dec. 1, 2016

(51) Int. Cl.
| | | |
|---|---|---|
| *F16H 57/12* | (2006.01) | |
| *F16H 37/12* | (2006.01) | |
| *G01S 7/02* | (2006.01) | |
| *G01S 7/40* | (2006.01) | |
| *G01S 13/93* | (2006.01) | |
| *F16H 1/16* | (2006.01) | |
| *G01S 13/86* | (2006.01) | |

(52) U.S. Cl.
CPC ............. *F16H 57/12* (2013.01); *F16H 37/12* (2013.01); *G01S 7/02* (2013.01); *G01S 7/4026* (2013.01); *G01S 13/931* (2013.01); *F16H 1/16* (2013.01); *F16H 2057/127* (2013.01); *G01S 13/86* (2013.01); *G01S 2007/027* (2013.01); *G01S 2007/4034* (2013.01); *G01S 2013/9375* (2013.01)

(58) Field of Classification Search
CPC .... F16H 57/12; F16H 37/12; F16H 2057/127; G01S 7/4026
See application file for complete search history.

(56) References Cited

U.S. PATENT DOCUMENTS

| | | | | |
|---|---|---|---|---|
| 4,589,299 A | * | 5/1986 | Kobayashi | .............. F16H 1/225 74/424.7 |
| 4,881,418 A | * | 11/1989 | Fimeri | .................... B60R 1/072 359/877 |
| 7,584,682 B2 | * | 9/2009 | Hsiao | ................... B60N 2/0296 74/10.27 |
| 2002/0023514 A1 | * | 2/2002 | Matsukawa | ............... F16H 1/16 74/425 |

(Continued)

FOREIGN PATENT DOCUMENTS

CN    101698400 B    9/2012

*Primary Examiner* — David M Fenstermacher
(74) *Attorney, Agent, or Firm* — Trop Pruner & Hu, P.C.

(57) ABSTRACT

An angle regulation device includes a casing, a regulating gear, a driving mechanism, a transmitting mechanism and a powering unit. The regulating gear is pivoted to the casing and is mounted with a radar detector. The driving mechanism includes co-rotatable rotating shaft, and first and second driving members. The transmitting mechanism includes first and second transmitting units each including a transmitting gear that meshes with the regulating gear and that has a gear radius smaller than that of the regulating gear, and a transmitting engaging structure that meshes with a respective one of the first and second driving members. The powering unit is coupled to the rotating shaft for rotating the radar detector relative to the casing.

6 Claims, 6 Drawing Sheets

(56) References Cited

U.S. PATENT DOCUMENTS

| | | | |
|---|---|---|---|
| 2003/0080734 A1* | 5/2003 | Hedayat | B60N 2/002 324/207.22 |
| 2004/0074326 A1* | 4/2004 | Minasian | E05B 81/25 74/89.18 |
| 2006/0117890 A1* | 6/2006 | Li | F16H 37/06 74/425 |
| 2010/0005918 A1* | 1/2010 | Mizuno | B25J 9/102 74/490.03 |
| 2012/0144942 A1* | 6/2012 | Yukitake | F16H 61/32 74/335 |
| 2015/0300053 A1* | 10/2015 | Milne | E05B 81/16 74/89.14 |
| 2015/0330483 A1* | 11/2015 | Yamagata | F16H 19/04 74/89.17 |

* cited by examiner

ANGLE REGULATION DEVICE

FIELD

The disclosure relates to an angle regulation device, and more particularly to an angle regulation device for mounting of a radar detector.

BACKGROUND

Referring to FIG. 1, Chinese Patent No. CN101698400B discloses a conventional angle regulation device for mounting of a radar detector 60. The conventional angle regulation device includes an upper casing 10, a lower casing 20, an angle transducer 30, a driving unit 40 and an adjusting unit 50. The upper casing 10 is fixed to a head portion of a vehicle. The lower casing 20 is pivoted to the upper casing through a pivot axle 201, and cooperates with the upper casing 10 to define a mounting space 70 therebetween. The radar detector 60 is mounted fixedly to the lower casing 20 and is received in the mounting space 70. The driving unit 40 includes a motor 401 that is mounted in the upper casing 10, and a nut 402 that is driven rotatably by the motor 401. The adjusting unit 50 includes screw 501 that engages drivingly the nut 402 and that has an end connected pivotally to the lower casing 20, and a coil spring 502 that is sleeved on the screw 501 and that has opposite ends abutting respectively against the upper and lower casings 10, 20. The angle transducer 30 is mounted in the upper casing 10 for positioning the motor 401. When an orientation sensor (not shown) fixed to the head portion of the vehicle senses tilt of the upper casing 10, the motor 401 is energized to drive rotation of the not 402, so as to move the screw 501 in a vertical direction (A). As such, an assembly of the lower casing 20 and the radar detector 60 can be kept at an optimal angle.

However, since the screw 501 is configured to adjust the tilt of the lower casing 20 directly, the resolution of the adjustment of the conventional angle regulation device is relative low. Moreover, the angle transducer 30 has a relatively short service life, so that the conventional angle regulation device needs to be repaired frequently.

SUMMARY

Therefore, an object of the disclosure is to provide an angle regulation device that can overcome at least one of the aforesaid drawbacks associated with the prior art.

According to the disclosure, the angle regulation device is for mounting of a radar detector, and includes a casing, a regulating gear, a driving mechanism, a transmitting mechanism and a powering unit. The casing receives the radar detector. The regulating gear is pivoted to the casing and is co-rotatable with the radar detector. The driving mechanism is disposed in the casing and includes a rotating shaft, and first and second driving members that are mounted co-rotatably to the rotating shaft. Each of the first and second driving members has a driving engaging structure. The transmitting mechanism is disposed in the casing and includes first and second transmitting units. Each of the first and second transmitting units includes a transmitting gear that meshes with the regulating gear and that has a gear radius smaller than that of the regulating gear, and a transmitting engaging structure that is co-rotatable with the transmitting gear and that meshes with the driving engaging structure of a respective one of the first and second driving members. The powering unit is coupled to the rotating shaft and is operable for rotating the first and second driving members to drive the regulating gear to pivot relative to the casing via the transmitting mechanism, so as to rotate the radar detector relative to the casing.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
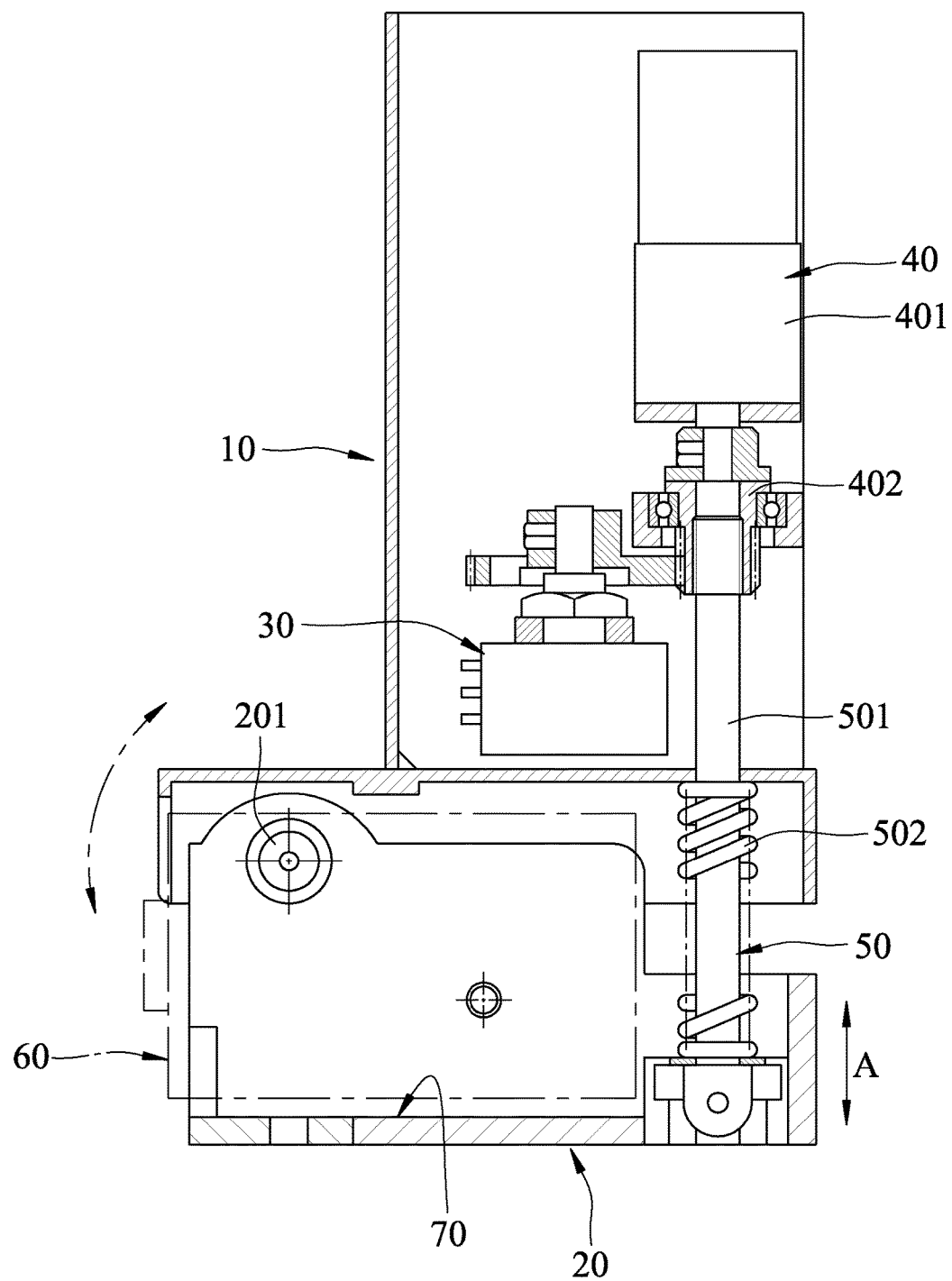
FIG. 1 is a sectional view of a conventional angle regulation device of Chinese Patent No. CN101698400B.

Before the disclosure is described in greater detail, it should be noted that like elements are denoted by the same reference numerals throughout the disclosure.

Referring to FIGS. 2 to 5, a first embodiment of an angle regulation device according to the disclosure is for mounting of a radar detector 3, and includes a casing 1, a mounting seat 2, a regulating gear 4, a driving mechanism 5, a transmitting mechanism 6, a powering unit 7, an orientation sensor 8 and a control unit 9.

The casing 1 is fixed to a vehicle (not shown) for receiving the radar detector 3 therein.

The regulating gear 4 is pivoted to the casing 1. In this embodiment, the regulating gear 4 is configured as a sector gear.

The mounting seat 2 is connected fixedly to the regulating gear 4 for being mounted with the radar detector 3, such that the radar detector 3 is co-rotatable with the regulating gear 4.

The driving mechanism 5 is disposed in the casing 1, and includes a rotating shaft 50, first and second driving members 51, 52 and a resilient member 53. In this embodiment, each of the first and second driving members 51, 52 is configured as a worm shaft.

The rotating shaft 50 is rotatable about a longitudinally extending axis thereof, and has a mount portion of a non-circular cross-section. In this embodiment, a lower portion of the rotating shaft 50 has a rectangular cross-section and serves as the mount portion.

The first driving member 51 is fixed to the rotating shaft 50, and has a threaded portion serving as a driving engaging structure 512.

The second driving member 52 has a threaded portion that serves as a driving engaging structure 522, and is formed with a non-circular through hole 524 that is complementary to the cross-section of the rotating shaft 50 and that permits the mount portion of the rotating shaft 50 to extend therethrough such that, the second driving member 52 is movable along the mount portion of the rotating shaft 50 and is co-rotatable with the rotating shaft 50 about the extending axis.

The resilient member 53 is connected between the first and second driving members 51, 52 for biasing resiliently the first and second driving member 51, 52 away from each other.

The transmitting mechanism 6 is disposed in the casing 1, and includes first and second transmitting units 61, 62. Each of the first and second transmitting units 61, 62 includes a transmitting gear 613, 623 that meshes with the regulating gear 4 and that has a gear radius smaller than that of the regulating gear 4, and a worm gear 611, 621 that is co-rotatable with the transmitting gear 613, 623 and that has a toothed portion serving as a transmitting engaging structure 612, 622. The transmitting engaging structure 612, 622 of each of the first and second transmitting units 61, 62 meshes with the driving engaging structure 512, 522 of a respective one of the first and second driving members 51, 52. In this embodiment, for each of the first and second transmitting units 61, 62, the worm gear 611, 621 has a gear radius greater than that of the transmitting gear 613, 623.

The powering unit 7 is coupled to and operable to rotate the rotating shaft 50 for rotating the first and second driving members 51, 52 to drive the regulating gear 4 to pivot relative to the casing 1 via the transmitting mechanism 6, so as to rotate the radar detector 3 relative to the casing 1. In this embodiment, the powering unit 7 is configured as a stepper motor.

The orientation sensor 8 is fixed to the casing 1 or the vehicle for sensing tilt of the casing to therefore generate a regulation signal.

The control unit 9 is electrically coupled to the orientation sensor 8 and the powering unit 7 for energizing the powering unit 7 upon receiving the regulation signal, so as to rotate the radar detector 3 relative to the casing 1 to keep the radar detector 3 at an optimal sensing angle.

It is noted that since the transmitting gear 613, 623 of each of the first and second transmitting units 61, 62 has a gear radius smaller than that of the regulating gear 4, and since the worm gear 611, 621 of each of the first and second transmitting units 61, 62 has a gear radius greater than that of the transmitting gear 613, 623 of a corresponding one of the first and second transmitting units 61, 62, the transmitting mechanism 6 serves as a reduction gear train that enhances the resolution of the regulating adjustment of the first embodiment to the radar detector 3.

Moreover, the resilient member 53 is configured to eliminate backlash occurring among the regulating gear 4, the driving mechanism 5 and the transmitting mechanism 6.

Figure 2:
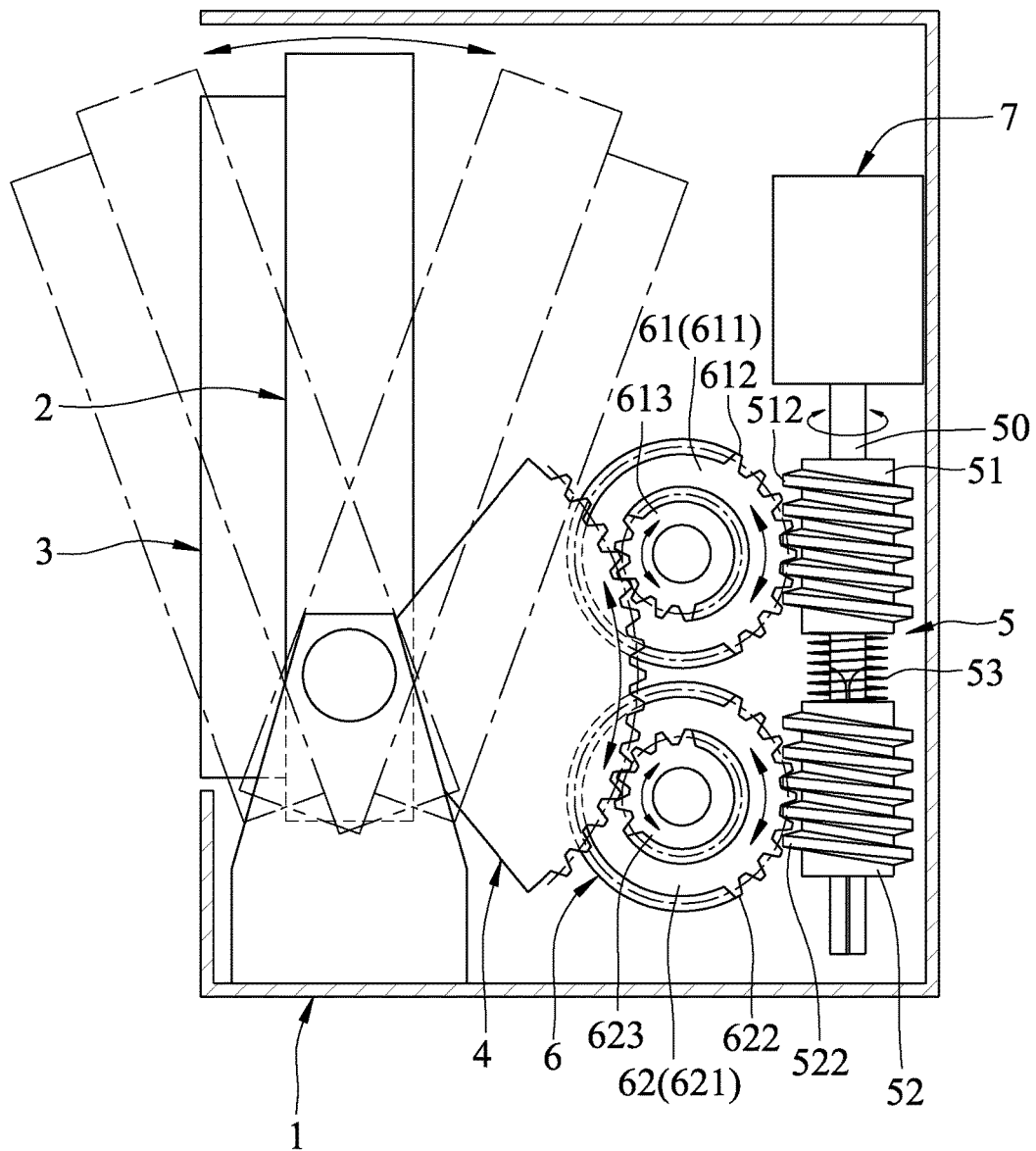
FIG. 2 is a sectional view of a first embodiment of an angle regulation device according to the disclosure.
Figure 3:
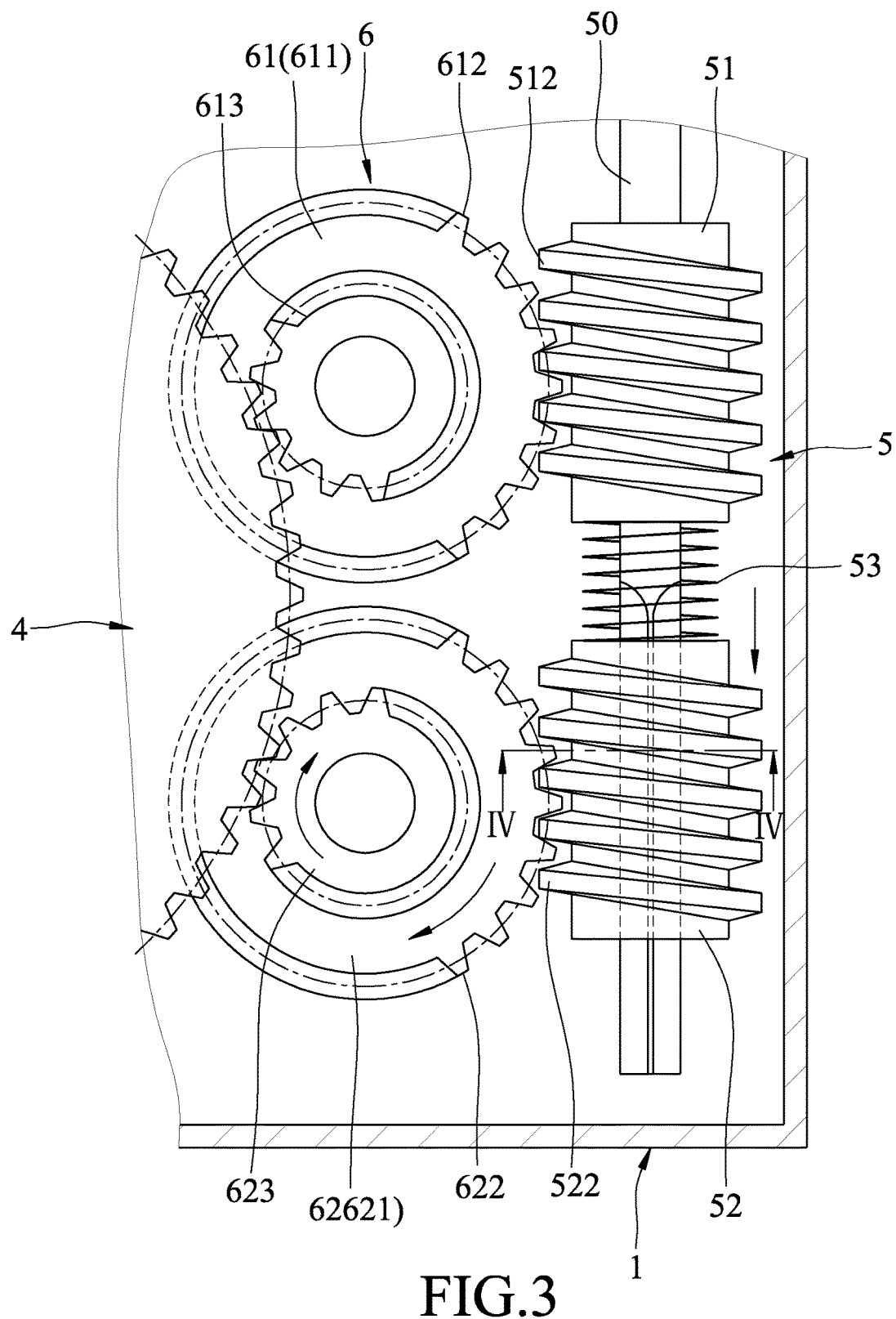
FIG. 3 is a fragmentary sectional view of the first embodiment.
Figure 4:
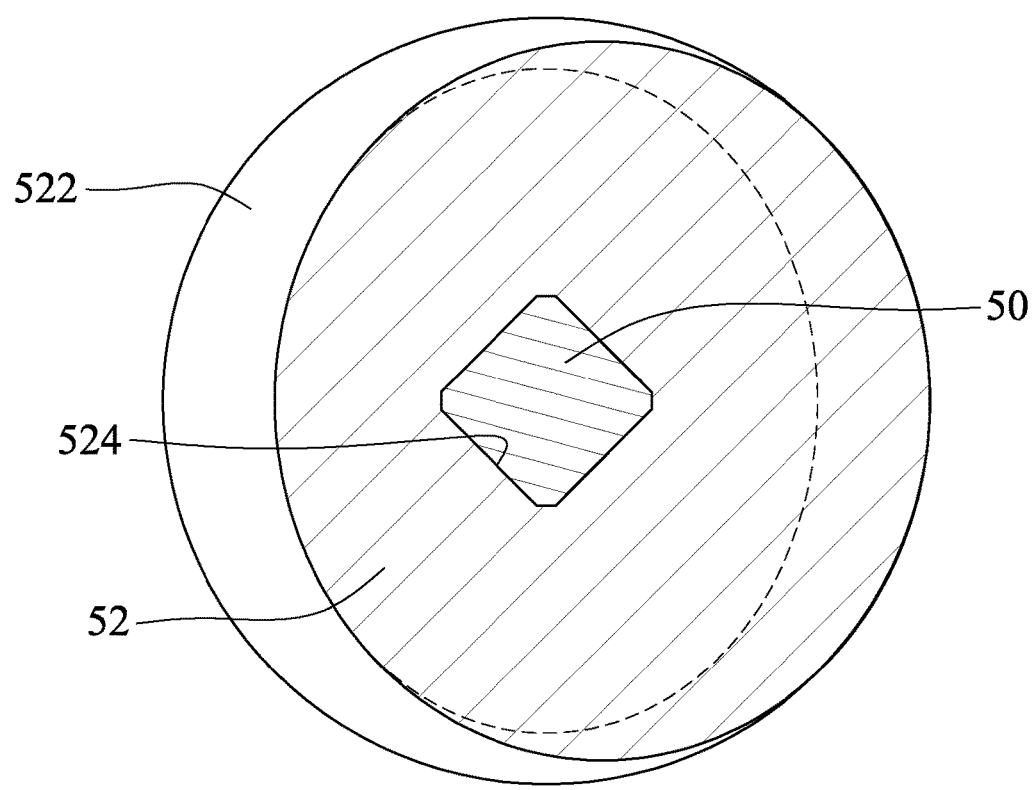
FIG. 4 is a sectional view of a second driving member of the first embodiment taken along line IV-IV in FIG. 3.
Figure 5:
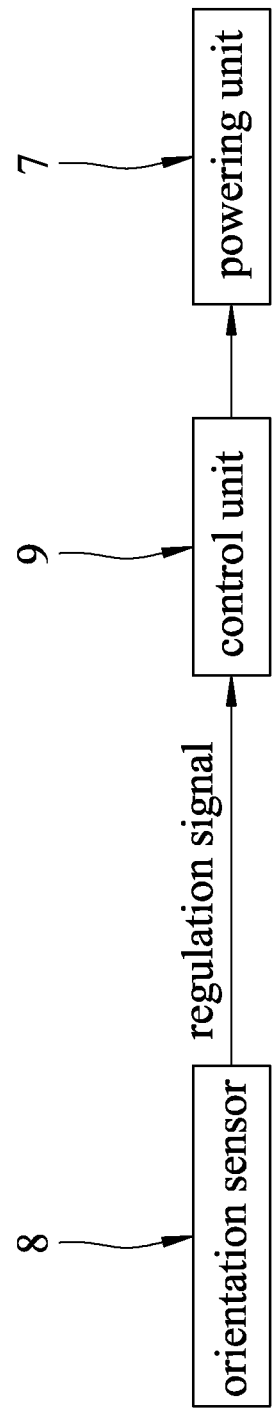
FIG. 5 illustrates operation of an orientation sensor and a control unit of the first embodiment for controlling a powering unit of the first embodiment.

For example, with reference to FIG. 2, when gaps among the regulating gear 4, the driving mechanism 5 and the transmitting mechanism 6 are formed due to wear, the second driving member 52 is biased by the resilient member 53 to move downwardly to abut against the worm gear 621 of the second transmitting unit 62 so as to rotate the second transmitting unit 62 clockwise. Afterward, the transmitting gear 623 of the second transmitting unit 62 rotates to abut against and drive the regulating gear 4 to rotate counterclockwise, so that the regulating gear 4 abuts against the transmitting gear 613 of the first transmitting unit 61, and drives the first transmitting unit 61 to rotate clockwise. Hence, the worm gear 611 of the first transmitting unit 61 rotates clockwise to abut against the first driving member 51, and the backlash of the first embodiment is therefore eliminated.

It is further noted that, since the powering unit 7 of this embodiment is configured as a stepper motor, the powering unit 7 can be positioned rapidly by the control unit 9, and no angle transducer is required in this embodiment. Therefore, the angle regulation device of this disclosure needs not be repaired frequently, and therefore has a prolonged service life.

Figure 6:
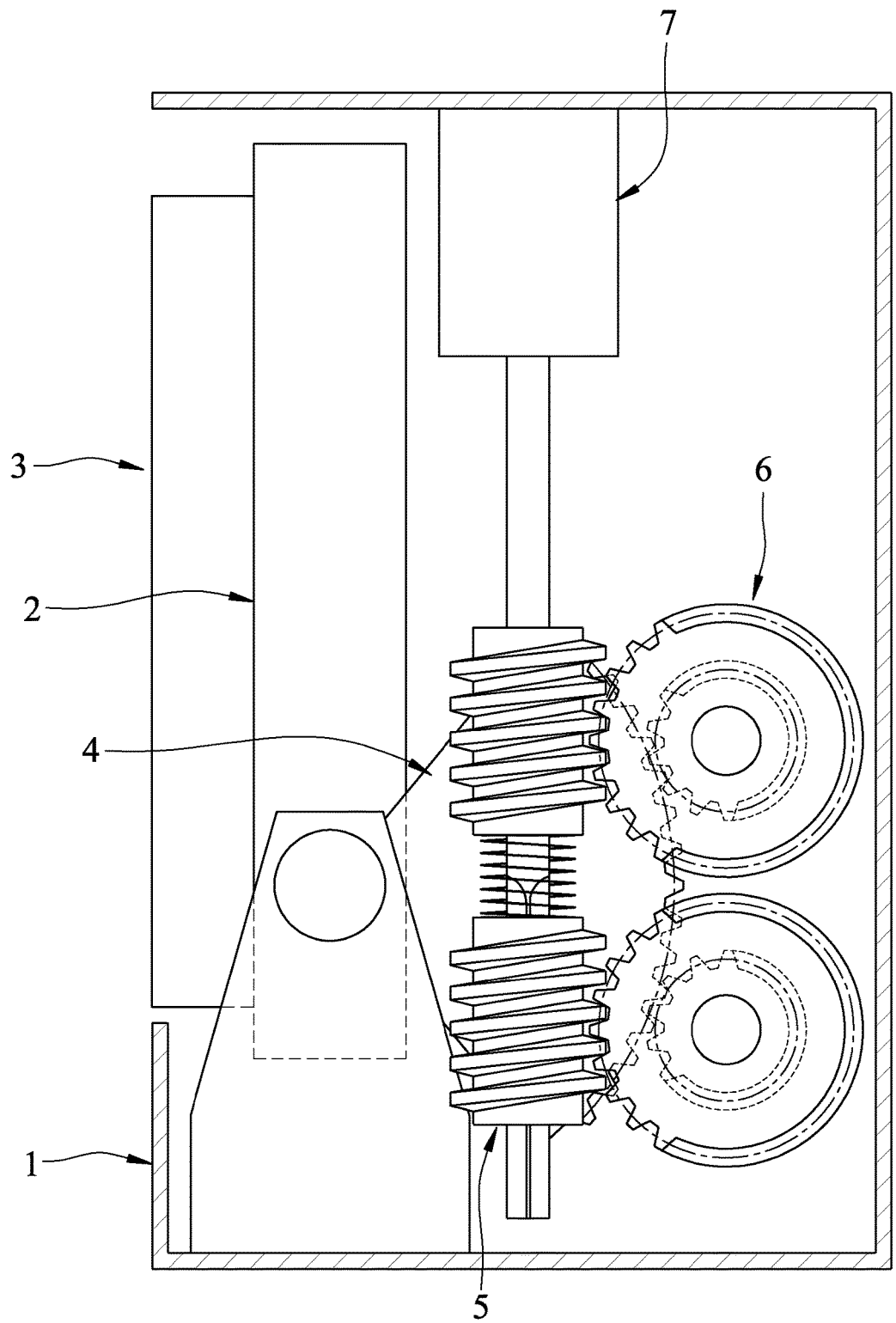
FIG. 6 is a sectional view of a second embodiment of the angle regulation device according to the disclosure.

Referring to FIG. 6, a second embodiment of the angle regulation device according to the disclosure is similar to the first embodiment. The difference between the first and second embodiments resides in that the driving mechanism 5 and the regulating gear 4 are located at the same side of the transmitting mechanism 6. As such, the width of the casing 1 of the second embodiment can be reduced.

The advantages of this disclosure are as follows.

1. By virtue of the transmitting mechanism 6, the angle regulation device has a higher resolution in adjusting the orientation of the radar detector 3 relative to the casing 1.

2. By virtue of the configuration of the driving mechanism 5, the backlash of the angle regulation device can be eliminated.

3. Since the powering unit 7 is configured as a stepper motor, the angle regulation device needs not be repaired frequently, and has a prolonged service life.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An angle regulation device adapted for mounting of a radar detector, comprising:

a casing adapted to receive the radar detector;

a regulating gear pivoted to said casing and adapted to be co-rotatable with the radar detector;

a driving mechanism disposed in said casing and including a rotating shaft, and first and second driving members that are mounted co-rotatably to said rotating shaft, each of said first and second driving members having a driving engaging structure;

a transmitting mechanism disposed in said casing and including first and second transmitting units, each of said first and second transmitting units including a transmitting gear that meshes with said regulating gear and that has a gear radius smaller than that of said regulating gear, and a transmitting engaging structure that is co-rotatable with said transmitting gear and that meshes with said driving engaging structure of a respective one of said first and second driving members;

a powering unit coupled to said rotating shaft and operable for rotating said first and second driving members to drive said regulating gear to pivot relative to said casing via said transmitting mechanism, so as to rotate the radar detector relative to said casing; and an orientation sensor and a control unit, said orientation sensor sensing tilt of said casing to generate a regulation signal, said control unit being electrically coupled to said orientation sensor and said powering unit for energizing said powering unit upon receiving the regulation signal so as to rotate the radar detector relative to said casing;

wherein each of said first and second driving members is configured as a worm shaft that has a threaded portion serving as said driving engaging structure, each of said first and second transmitting units further including a worm gear that is co-rotatable with said transmitting gear and that has a toothed portion serving as said transmitting engaging structure.

2. The angle regulation device as claimed in claim 1, wherein one of said first and second driving members is movable along said rotating shaft, said driving mechanism further including a resilient member that is connected between said first and second driving members for biasing resiliently said first and second driving members away from each other.

3. The angle regulation device as claimed in claim 1, wherein, for each of said first and second transmitting units, said worm gear has a gear radius greater than that of said transmitting gear.

4. The angle regulation device as claimed in claim 1, wherein said powering unit is configured as a stepper motor.

5. The angle regulation device as claimed in claim 1, wherein said regulating gear is configured as a sector gear.

6. The angle regulation device as claimed in claim 1, further comprising a mounting seat that is connected fixedly to said regulating gear and that is adapted for being mounted with the radar detector.

* * * * *